(12) United States Patent
Kato

(10) Patent No.: US 9,372,066 B2
(45) Date of Patent: Jun. 21, 2016

(54) INTERFEROMETER

(75) Inventor: Shigeki Kato, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 688 days.

(21) Appl. No.: 12/966,210

(22) Filed: Dec. 13, 2010

(65) Prior Publication Data

US 2011/0141479 A1   Jun. 16, 2011

(30) Foreign Application Priority Data

Dec. 14, 2009   (JP) .................................. 2009-283432

(51) Int. Cl.
*G01B 9/02* (2006.01)
*G01B 11/02* (2006.01)

(52) U.S. Cl.
CPC .......... *G01B 9/02064* (2013.01); *G01B 9/0209* (2013.01); *G01B 9/02018* (2013.01); *G01B 9/02057* (2013.01); *G01B 2290/70* (2013.01)

(58) Field of Classification Search
CPC .. G01B 9/02; G01B 9/02064; G01B 9/02057; G01B 9/02018; G01B 9/0209; G01B 2290/70; G01B 11/2441; G01B 9/02059; G01B 9/02015; G01N 21/23; G01N 21/45
USPC .................. 356/491, 492, 493, 506
See application file for complete search history.

(56) References Cited

U.S. PATENT DOCUMENTS

| | | | | |
|---|---|---|---|---|
| 3,520,615 | A * | 7/1970 | Smith | 356/453 |
| 5,153,669 | A | 10/1992 | DeGroot | |
| 6,778,280 | B2 * | 8/2004 | De Groot et al. | 356/493 |
| 6,795,188 | B2 * | 9/2004 | Ruck et al. | 356/416 |

(Continued)

FOREIGN PATENT DOCUMENTS

| | | |
|---|---|---|
| JP | 04-54406 A | 2/1992 |
| JP | 05-071913 A | 3/1993 |

(Continued)

OTHER PUBLICATIONS

Yah-Lin Liang et al., Design of form-birefringent multilayer nonpolarizing beam splitter, Optics Communications 271 (2007) 569-572.*

(Continued)

*Primary Examiner* — Tarifur Chowdhury
*Assistant Examiner* — Sunghee Y Gray
(74) *Attorney, Agent, or Firm* — Rossi, Kimms & McDowell LLP

(57) ABSTRACT

An interferometer comprises: a light source; a first polarization beam splitter configured to reflect, as reference light, a first polarization component of light emitted from the light source, and to transmit, as measurement light, a second polarization component of the light emitted from the light source; a birefringent-material element located between the light source and the first polarization beam splitter; and a light-receiving device configured to receive an interfering light generated by interference of the measurement light transmitted through the first polarization beam splitter, reflected by a reflecting surface to be measured, and transmitted through the first polarization beam splitter, with the reference light reflected by the first polarization beam splitter. The interferometer is configured such that the reference light and the measurement light pass through the birefringent-material element between the first polarization beam splitter and the light-receiving device.

10 Claims, 8 Drawing Sheets

(56) References Cited

U.S. PATENT DOCUMENTS

| | | | |
|---|---|---|---|
| 6,903,820 B2 | 6/2005 | Wang | |
| 7,391,521 B2 | 6/2008 | Ishizuka | |
| 2001/0009462 A1* | 7/2001 | Shirley | 356/517 |
| 2002/0070349 A1* | 6/2002 | Hoyt | 250/458.1 |
| 2003/0067602 A1* | 4/2003 | Patel et al. | 356/369 |
| 2003/0095477 A1* | 5/2003 | Horimai et al. | 369/13.28 |
| 2003/0197869 A1 | 10/2003 | Johnstone et al. | |
| 2004/0246490 A1 | 12/2004 | Wang | |
| 2006/0215171 A1* | 9/2006 | Nakata et al. | 356/487 |
| 2007/0035743 A1* | 2/2007 | Vakoc et al. | 356/495 |
| 2008/0252888 A1* | 10/2008 | Wegmann et al. | 356/365 |
| 2011/0075153 A1* | 3/2011 | Hogan | 356/491 |

FOREIGN PATENT DOCUMENTS

| | | | | | |
|---|---|---|---|---|---|
| JP | 11066600 | * | 3/1999 | | |
| JP | 2000-234914 A | | 8/2000 | | |
| JP | 2006-112974 A | | 4/2006 | | |
| JP | 2006-526790 A | | 11/2006 | | |
| JP | EP 1748277 | * | 1/2007 | | G01B 9/02 |
| JP | EP 2120005 | * | 11/2009 | | G01B 9/02 |

OTHER PUBLICATIONS

Extended European Search Report issued in corresponding European Patent Application No. 10191358.0 dated Mar. 22, 2011.

Japanese office action cited in Japanese counterpart application No. JP2009-283432, dated Sep. 27, 2013.

* cited by examiner

INTERFEROMETER

BACKGROUND OF THE INVENTION

1. Field of the Invention

The present invention relates to an interferometer that modulates a measurement light with a reference light to obtain a modulated light having a phase associated with movement of an object, and converts the modulated light into an electrical signal by a light-receiving device to obtain information of displacement of the object.

2. Description of the Related Art

Conventionally, a laser interferometer having high accuracy and high resolution is used as an apparatus for measuring the displacement of an object such as a stage. FIG. 7 is a view showing the arrangement of a conventional interferometer. This interferometer is disclosed in Japanese Patent Laid-Open No. 05-071913. A laser beam 11 emitted from a light source 1 and having a wavelength $\lambda$ (633 nm) enters a polarization beam splitter (PBS) 2, and is split into reference light 12a and measurement light 12b by a PBS plane 2P. The reference light 12a is reflected by a reference mirror 4a and re-enters the PBS 2 through the same optical path. Since the reference light 12a is transmitted through a $\lambda/4$ plate 3a twice, the P wave is converted into the S wave. Therefore, the reference light 12a is transmitted through the PBS plane 2P this time, and enters a reflective element 5 as a light beam 13a. On the other hand, the measurement light 12b is reflected by a reflecting surface 4b, and re-enters the PBS 2 through the same optical path. Since the measurement light 12b is transmitted through a $\lambda/4$ plate 3b twice, the S wave is converted into the P wave. Accordingly, the measurement light 12b is reflected by the PBS plane 2P this time, and enters the reflective element 5 as a light beam 13b like the reference light 13a. After that, the reference light is retransmitted through the PBS 2 to form a light beam 14a, and the measurement light 12b is reflected by the PBS 2 again to form a light beam 14b. The light beams 14a and 14b are transmitted through the $\lambda/4$ plate twice, and re-enter the PBS 2. The light beams 14a and 14b are combined into a light beam 15, and an interference signal having a $\lambda/4$ period is obtained by the movement of the reflecting surface 4b.

In the conventional interferometer shown in FIG. 7, a large number of reflecting surfaces exist in the optical paths. For example, a component reflected by a reflecting surface 21b of the $\lambda/4$ plate 3b propagates through the same optical path as that of ordinary measurement light. This component is finally superposed on the light beam 15, and modulated by the movement of the reflecting surface 4b. However, the component reflected by the reflecting surface 21b of the $\lambda/4$ plate 3b arrives at the reflecting surface 4b after being reflected only once. Therefore, the modulation amount is half that of the ordinary reflection component, and an interference signal having a period of $\lambda/2$ is obtained. Assuming that the reflectance of an antireflection coat (AR coat) of the reflecting surface 21b is 0.2%, the interference intensity of an interference signal generated from ghost light (stray light) reflected by the reflecting surface 21b is about 9% that of a main signal from the viewpoint of wave optics. Even when an AR coat having a very low reflectance of 0.01% is formed, an interference intensity of 2.5% is generated. A waveform as shown in FIG. 8 is obtained because sine-wave signals caused by all ghost light components are superposed on an electrical signal output from a light-receiving device 16. It is normally possible to obtain a sub-nanometer resolution by electrically dividing a sine-wave periodical signal modulated in accordance with the obtained displacement. However, deterioration of the linearity as shown in FIG. 9 occurs in the signal on which the components caused by the ghost light are superposed, and the error amount reaches a few nm to a few ten nm. This poses a serious problem in ultra-high-accuracy applications.

SUMMARY OF THE INVENTION

The present invention provides an interferometer advantageous in terms of measurement precision.

According to one aspect of the present invention, there is provided an interferometer comprising: a light source; a first polarization beam splitter configured to reflect, as reference light, a first polarization component of light emitted from the light source, and to transmit, as measurement light, a second polarization component of the light emitted from the light source; a birefringent-material element located between the light source and the first polarization beam splitter; and a light-receiving device configured to receive an interfering light generated by interference of the measurement light transmitted through the first polarization beam splitter, reflected by a reflecting surface to be measured, and transmitted through the first polarization beam splitter, with the reference light reflected by the first polarization beam splitter, wherein the interferometer is configured such that the reference light and the measurement light pass through the birefringent-material element between the first polarization beam splitter and the light-receiving device.

Further features of the present invention will become apparent from the following description of exemplary embodiments with reference to the attached drawings.

DESCRIPTION OF THE EMBODIMENTS

Embodiments of the present invention will be explained below with reference to the accompanying drawings.

[First Embodiment]

Figure 1:
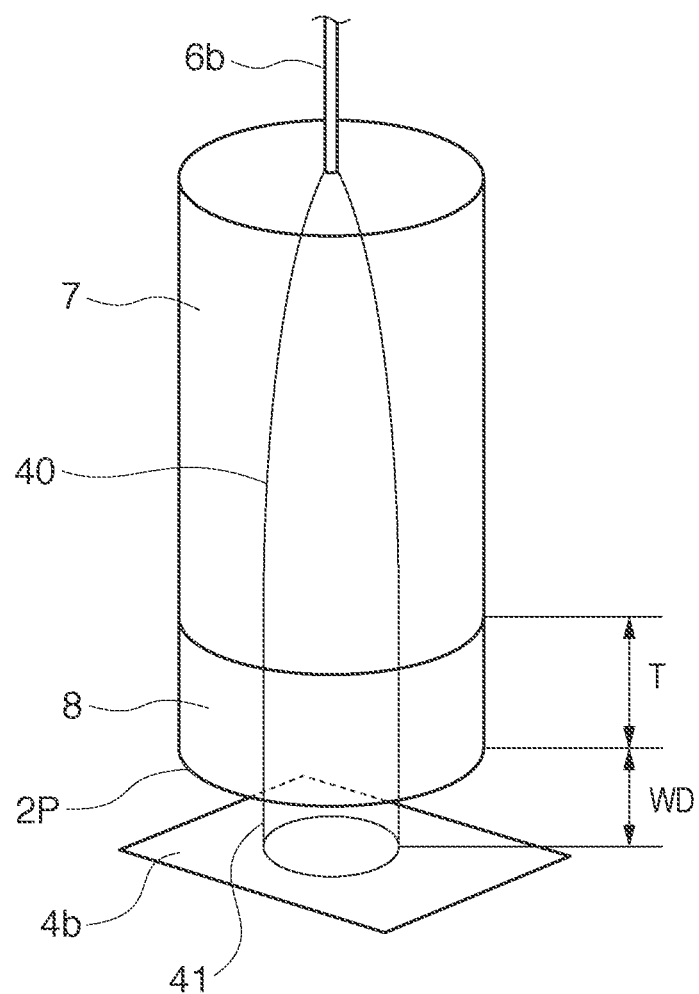
FIG. 1 is an enlarged view of the main parts of a photodetector of the first embodiment.
Figure 2:
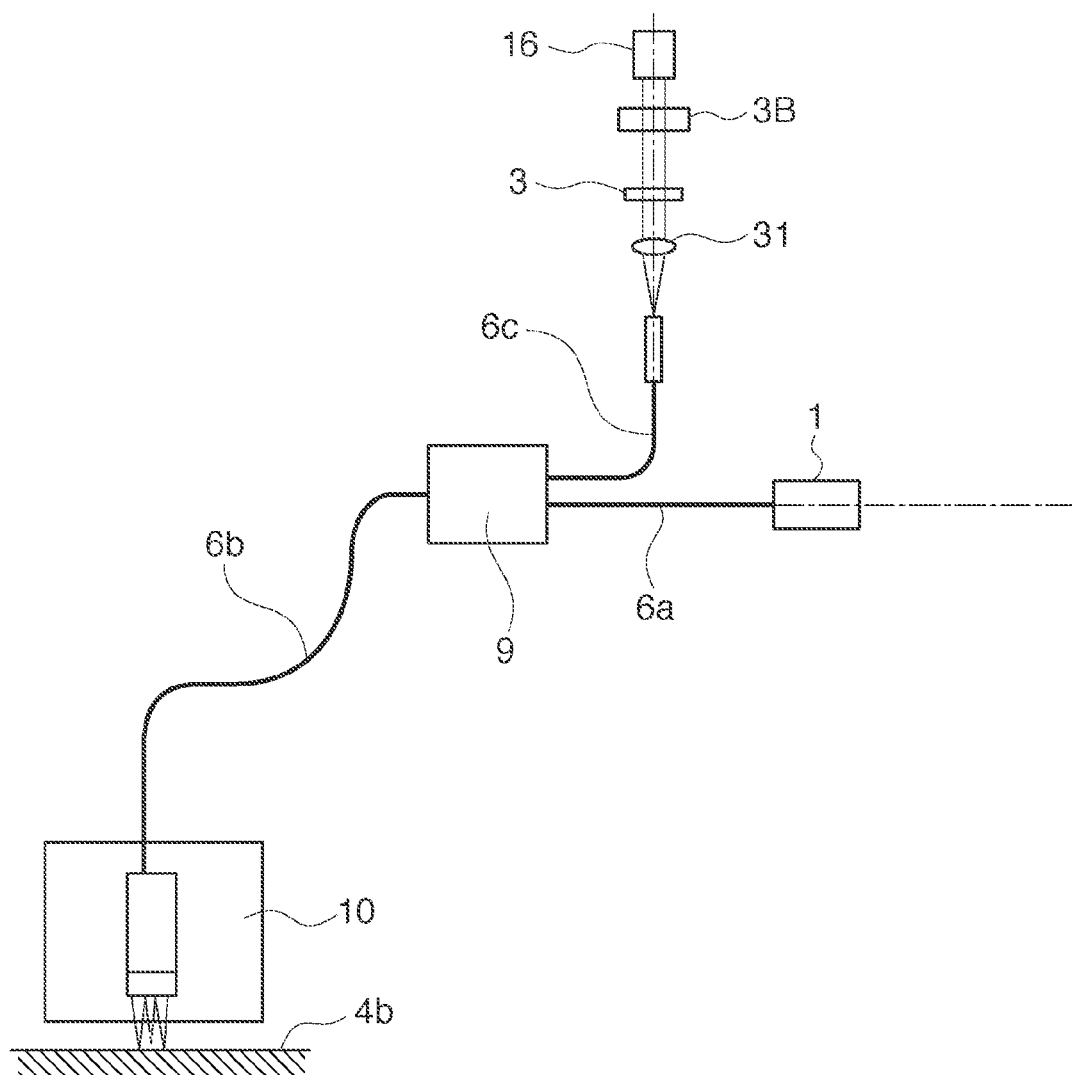
FIG. 2 is a view showing the whole configuration of an interferometer of the first embodiment.

FIGS. 1 and 2 are views showing the arrangements of an interferometer of the first embodiment. A laser beam emitted from a light source 1 and having a wavelength $\lambda$ (633 nm) is guided to a single-mode fiber 6a, and then guided to a photodetector 10 through a branching filter 9 and single-mode fiber 6b. The laser beam of linear polarization light emitted from the fiber 6b is collimated by a gradient index lens (Grin lens) 7, and guided to a rutile plate 8 as an element of a birefringent material. A PBS film 2P as a first polarization beam splitter is deposited on the end face of the rutile plate 8 having a thickness T. That is, the rutile plate 8 is located between the end portion of the fiber 6b and the PBS film 2P. Of the light emitted from the light source 1, the PBS film 2P transmits the P wave (a first polarization component) as reference light, and the S wave (a second polarization component) as measurement light. The PBS film 2P can be a PBS film formed by a microstructure. The S wave as the measurement light is transmitted through the PBS film 2P, and reflected to the same optical path again by a reflecting surface 4b as a surface to be measured. The S wave then converges through the rutile plate 8 and Grin lens 7, and is guided to the fiber 6b again. On the other hand, the P wave as the reference light converges through the rutile plate 8 and Grin lens 7, and is guided to the fiber 6b again. The S wave as the measurement light and the P wave as the reference light are retransmitted through the fiber 6b, guided to the branching filter 9, and then guided to a fiber 6c this time. The light beam diverging from the end face of the fiber 6c is collimated into parallel light by a lens 31 and transmitted through a $\lambda/4$ plate 3 and polarizing plate 3B. A light-receiving device 16 receives interfering light of the measurement light and reference light. When the reflecting surface 4b moves in the optical-axis direction, only the phase of the S wave as the measurement light changes. Therefore, the light beam transmitted through the $\lambda/4$ plate 3 is rotating linear polarization light. The light beam is further converted into a bright-and-dark signal of light through the polarizing plate 3B. This signal is a sine signal having a period that changes at $\lambda/2=316.5$ nm.

Since the optical system shown in FIG. 2 forms a Fizeau interferometer as explained above, the photodetector 10 is made compact. In a Fizeau optical system, reference light and measurement light normally have different optical path lengths. Therefore, the light source 1 is limited to a longitudinal-single-mode light source having a high coherency. However, the interferometer of the first embodiment has the following feature because the rutile plate 8 is used. When the optical axis of an extraordinary ray of the rutile plate 8 is aligned with the polarization axis of the above-mentioned P wave, the rutile transmission optical path length of the P wave is longer by T×0.3 than that of the S wave. That is, geometrically, the P wave and S wave are transmitted, and the optical path length of the S wave entering the reflecting surface 4b looks long by a distance WD between the end face of the PBS film 2P and the reflecting surface 4b. In practice, however, the wave-optics optical path lengths of the P wave and S wave equal when WD is T×0.3. That is, although the optical system is a Fizeau interferometer, the function of the rutile plate 8 formed before the PBS film 2P makes it possible to equalize the optical path lengths of the measurement light and reference light. Accordingly, a signal can be output in a position spaced apart from the PBS film 2P even when using a low-coherency light source. This broadens the range of selection of the light source 1. For example, when using a super luminescent diode (SLD) light source or white-light-interfering light as the light source 1, the utility value increases because the interferometer can be used in micro-range peak detection and the like. Also, when using a low-coherency light source, ghost light components of the P wave and S wave not reflected by the reflecting surface 4b or PBS film 2P a defined number of times have optical path lengths different from those of the P wave and S wave reflected by the defined number of times. Since, therefore, the ghost light (stray light) does not generate any interference signal, it is possible to largely prevent the reduction in measurement accuracy caused by the ghost light. In this embodiment, the birefringent-material element 8 is formed by a rutile plate. However, the same effect can be obtained even when the birefringent-material element is formed by a material having the birefringent effect like the rutile plate, for example, calcite or yttrium vanadate.

[Second Embodiment]

Figure 3:
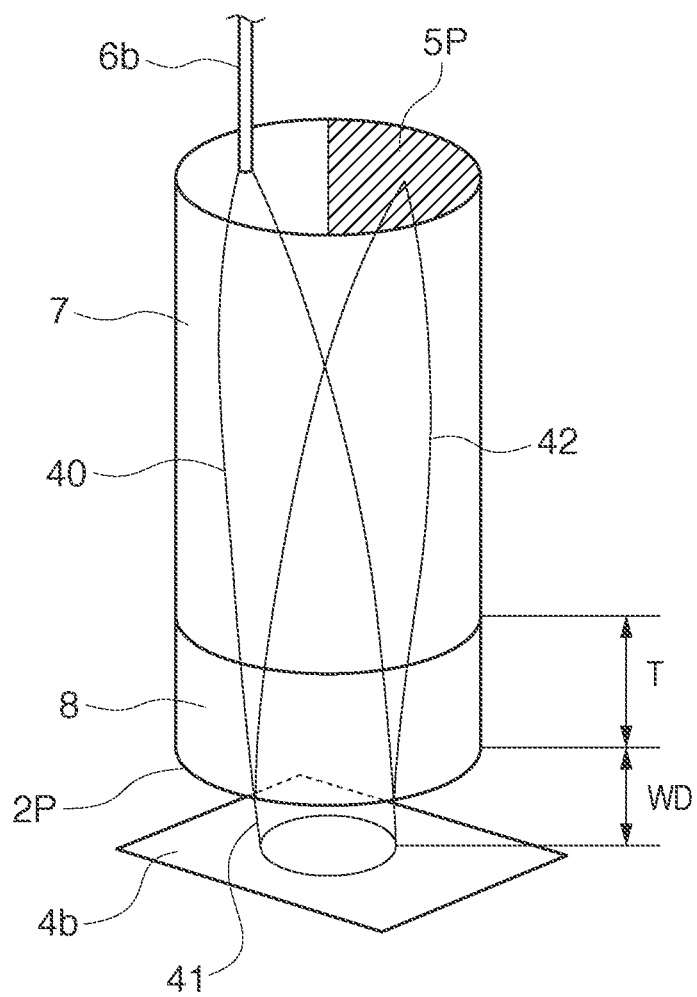
FIG. 3 is an enlarged view of the main components of a photodetector of the second embodiment.

FIG. 3 is a view showing the arrangement of an interferometer of the second embodiment. The second embodiment differs from the first embodiment in the arrangement of a photodetector 10. More specifically, a fiber 6b that emits a light beam toward the photodetector 10 is placed in a position offset from the center of a Grin lens 7. Also, a mirror surface 5P is formed in a position on the Grin lens, which is opposite to a portion where the fiber 6b emits the light beam. The mirror surface 5P forms a first mirror surface that reflects, toward a PBS film 2P, measurement light reflected by a reflecting surface 4b and transmitted through the PBS film 2P, and reference light reflected by the PBS film 2P.

A light beam 40 emitted from the fiber 6b is split into measurement light 41 transmitted through the PBS film 2P, and reference light 42 reflected by the PBS film 2P. The measurement light 41 propagates from the PBS film 2P to the fiber 6b via the reflecting surface 4b, the PBS film 2P, the mirror surface 5P, the PBS film 2P, the reflecting surface 4b, the PBS film 2P, and a rutile plate 8. On the other hand, the reference light 42 propagates from the PBS film 2P to the fiber 6b via the mirror surface 5P, PBS film 2P, and rutile plate 8.

Since the interferometer of the second embodiment forms a double-path Fizeau interferometer as described above, a sine signal having a period of $\lambda/4$ is obtained for the movement of the reflecting surface 4b. In this arrangement, ghost light is generated to some extent due to the performance of the extinction ratio of the PBS film 2P. For example, if the S wave to be transmitted is reflected to pass through the internal optical system again and then transmitted through the PBS film 2P, a signal having a period of $\lambda/2$ is output from the movement of the reflecting surface 4b. However, when using a light source having a broad wavelength such as an SLD light source, ghost light components have optical path lengths different from those of both reference light and measurement light as main light components, and hence do not generate any interference signal. It is thus possible to prevent the interference of the ghost light components in the second embodiment as well. Since this improves the quality of an interference signal of a displacement signal, the interferometer is applicable to very-high-accuracy measurements.

[Third Embodiment]

Figure 4:
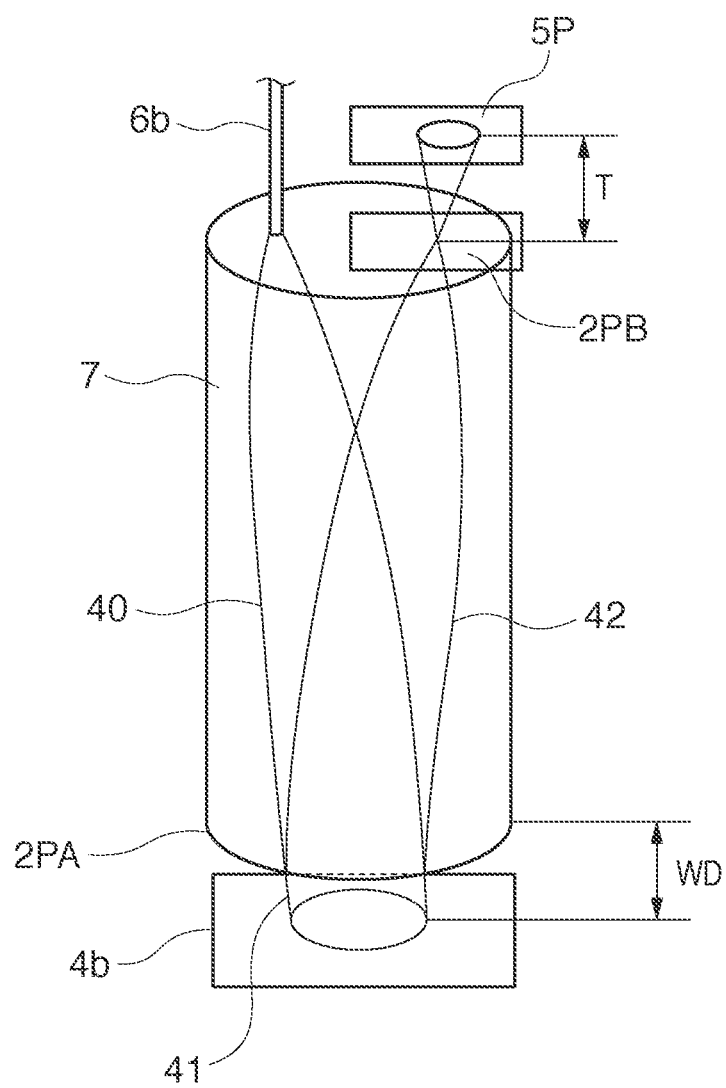
FIG. 4 is an enlarged view of the major components of a photodetector of the third embodiment.

FIG. 4 is a view showing the arrangement of an interferometer of the third embodiment. The third embodiment differs from the first embodiment in the arrangement of a photodetector 10, and uses the same light source 1 and light-receiving device 16 as those of the first embodiment. A laser beam 40 emitted from a fiber 6b is collimated into a parallel light beam by a Grin lens 7, and enters a PBS film 2PA. The PBS film 2PA is formed by a microstructure using a semiconductor process or the like. The direction of this microstructure is set such that the PBS film 2PA reflects the P wave and transmits the S wave. Accordingly, the S wave as measurement light 41 is transmitted through the PBS film 2PA, reflected by a reflecting surface 4b, retransmitted through the PBS film 2PA, and collimated into a converged light beam again by the Grin lens 7, and this converged light beam enters a PBS film 2PB. On the other hand, the P wave as reference light 42 is reflected by the PBS film 2PA, and collimated into a converged light beam by the Grin lens 7 like the measurement light 41, and this converted light beam enters the PBS film 2PB. The PBS film 2PB has a microstructure similar to that of the PBS film 2PA, but the direction of this microstructure is set to be perpendicular to the PBS film 2PA. Therefore, the PBS film 2PB reflects the S wave as the measurement light 41, and transmits the P wave as the reference light 42. The PBS film 2PB forms a second polarization beam splitter that reflects, toward the PBS film 2PA, the measurement light 41 reflected by the reflecting surface 4b and transmitted through the PBS film 2PA, and transmits the reference light 42 reflected by the PBS film 2PA. The reference light 42 transmitted through the PBS film 2PB is reflected by a Fresnel mirror 5P set in a position spaced apart by a distance T from the PBS film 2PB, and re-enters the PBS film 2PB through the same optical path. The surface of the Fresnel mirror 5P forms a second mirror surface that reflects, toward the PBS film 2PB, the reference light 42 transmitted through the PBS film 2PB. The S wave as the measurement light 41 and the P wave as the reference light 42 re-enter the PBS film 2PA, the measurement light 41 is transmitted through the PBS film 2PA, reflected by the reflecting surface 4b, retransmitted through the PBS film 2PA, and combined with the reference light 42 reflected by the PBS film 2PA again, and the combined light converges to the fiber 6b. When T=WD in the above-mentioned arrangement, the wave-optics optical path lengths of the measurement light 41 and reference light 42 are equal, so an interferometer having equal optical paths in positions spatially apart from the PBS film 2PA can be formed as in the first and second embodiments. Accordingly, an interferometer using a light source such as an SLD can be formed by a Fizeau optical system in the third embodiment as well. This makes it possible to obtain the same effect as that of the second embodiment against ghost light. In this embodiment, the surface of the Fresnel mirror 5P is used as the second mirror surface for reflecting, toward the PBS film 2PB, the reference light transmitted through the PBS film 2PB. However, the surface of a spherical mirror can also be used as the second mirror surface. Furthermore, in this embodiment, the PBS film 2PB and the Fresnel mirror 5P as the second mirror are separately installed. However, it is also possible to use the PBS film 2PB and Fresnel mirror 5P formed on a single substrate.

[Fourth Embodiment]

Figure 5:
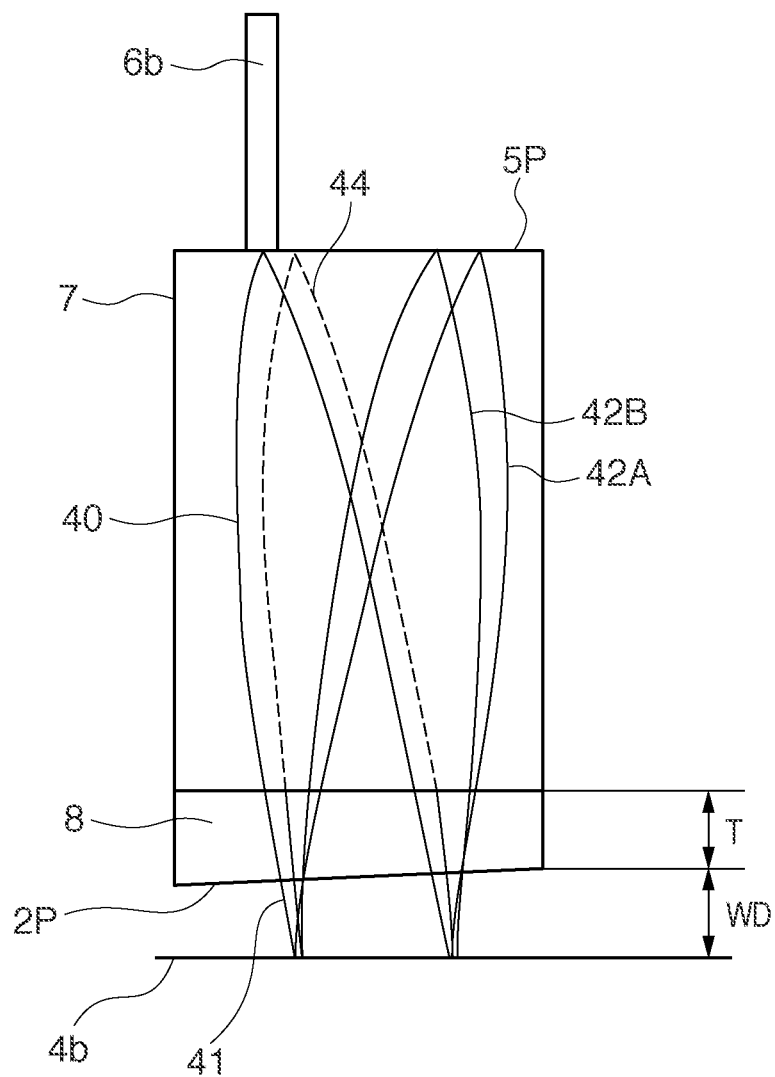
FIG. 5 is an enlarged view of the major parts of a photodetector of the fourth embodiment.

FIG. 5 is a view showing the arrangement of an interferometer of the fourth embodiment. The interferometer of the fourth embodiment has the same arrangement as that of the interferometer of the second embodiment except that a PBS film 2P is located to incline to a plane on which a reflecting surface 4b is to be positioned. Inclining the PBS film 2P improves the effect of removing ghost light components. In double optical paths, a light beam reflected by the reflecting surface 4b and PBS film 2P for the first time is separated into light beams 42A and 42B, but light beams reflected by a mirror surface 5P and reflected toward a fiber 6b by the reflecting surface 4b and PBS film 2P again are accurately superposed and combined. That is, a light beam having entered the reflecting surface 4b a defined number of times propagates toward the fiber 6b and generates an interference signal, but a ghost light component not having entered the reflecting surface 4b the defined number of times finally generates a light beam 44, and cannot be guided to the fiber 6b. The interferometer of the fourth embodiment more effectively removes fine ghost light components. Therefore, the final signal distortion is small, and the signal-to-noise ratio (S/N ratio) can be increased. This makes the interferometer more effective in ultra-high-accuracy measurements.

[Fifth Embodiment]

Figure 6:
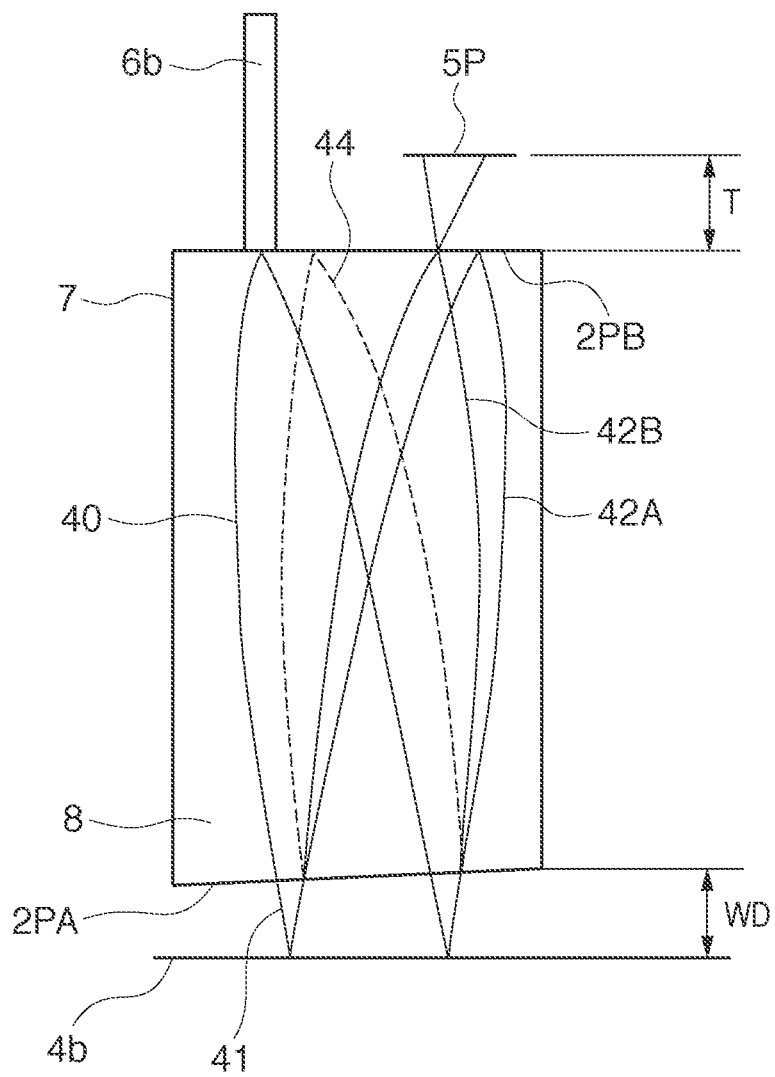
FIG. 6 is an enlarged view of the main components of a photodetector of the fifth embodiment.
Figure 7:
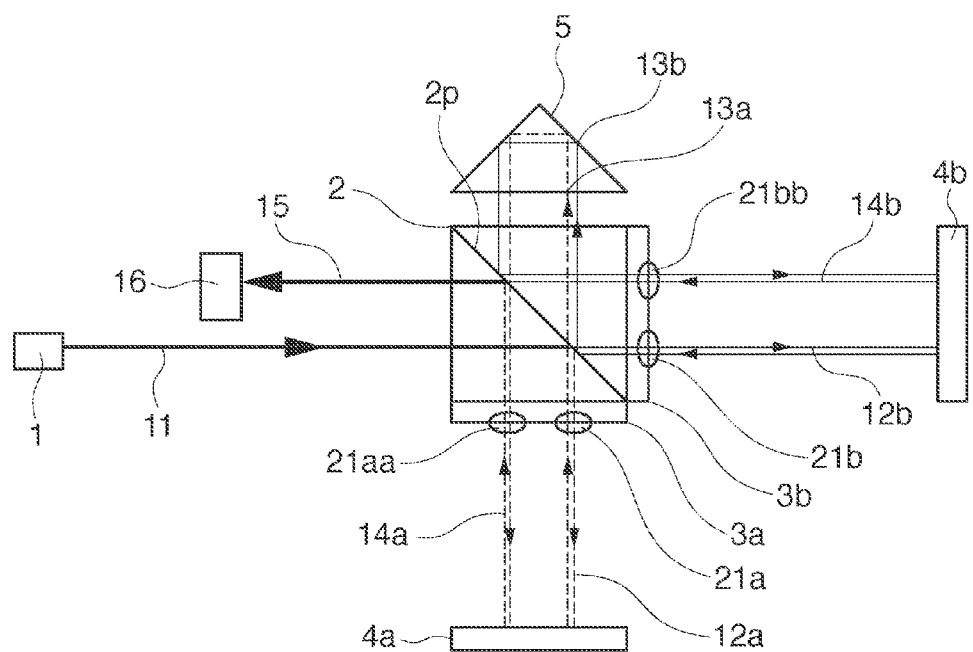
FIG. 7 is a schematic view of a conventional interferometer.
Figure 8:
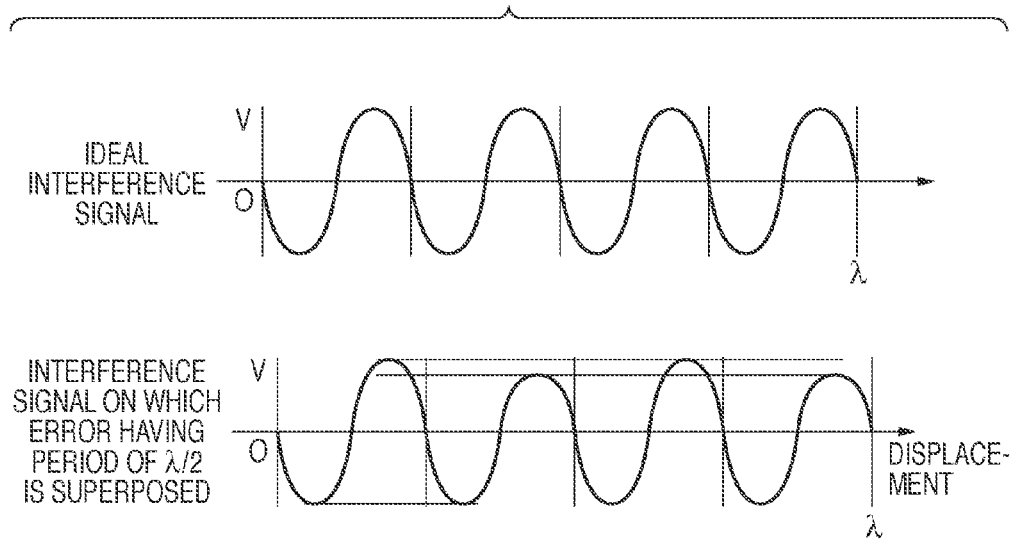
FIG. 8 is a conceptual view of the signal outputs of the conventional interferometer.
Figure 9:
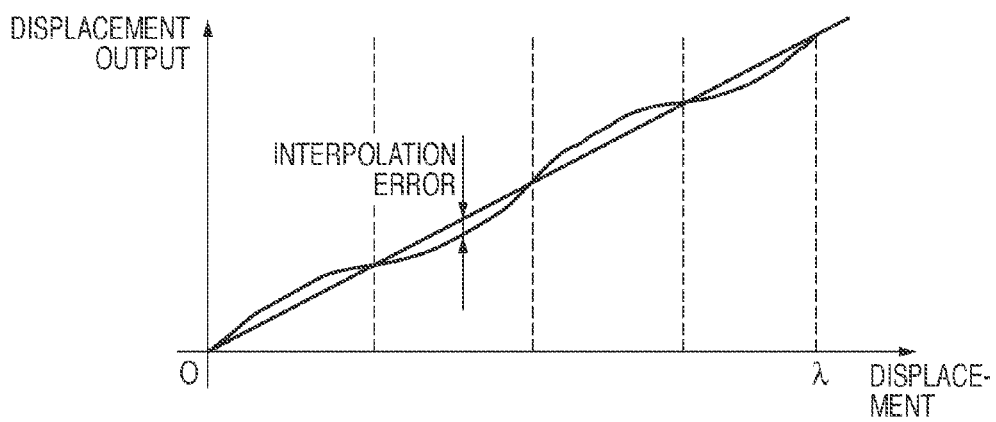
FIG. 9 is a view for explaining an interpolation error when a measurement error caused by ghost light occurs.

FIG. 6 is a view showing the arrangement of an interferometer of the fifth embodiment. The interferometer of the fifth embodiment has the same arrangement as that of the interferometer of the third embodiment except that a PBS film 2PA is located to incline to a plane on which a reflecting surface 4b is to be positioned. Inclining the PBS film 2PA achieves the same effect as that of the fourth embodiment, and is effective in ultra-high-accuracy measurements.

The first to fifth embodiments are applicable to an interferometer or displacement sensor for measuring a micro displacement by converting the phase modulation of light such as a laser beam into intensity-modulated light.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-283432 filed Dec. 14, 2009, which is hereby incorporated by reference herein in its entirety.

What is claimed is:

1. An interferometer comprising:
   a light source;
   a first polarization beam splitter configured to reflect, as reference light, a first polarization component of light emitted from the light source, and to transmit, as measurement light, a second polarization component of the light emitted from the light source;
   a birefringent-material element; and
   a light-receiving device configured to receive an interfering light generated by interfering the measurement light transmitted through the first polarization beam splitter, reflected by a reflecting surface to be measured, and transmitted through the first polarization beam splitter, with the reference light reflected by the first polarization beam splitter,
   wherein the interferometer is configured so that the reference light and the measurement light propagate from the first polarization beam splitter to the light-receiving device through the birefringent-material element, and
   wherein a thickness of the birefringent-material element and a position of the reflecting surface are defined to provide the reference light and the measurement light with respective optical path lengths that allow the reference light and the measurement light to interfere with each other, and to provide a stray light of the reference light or the measurement light or both thereof with an optical path length that prevents the stray light from interfering with the reference light and the measurement light.

2. The interferometer according to claim 1, further comprising:
   a first mirror surface configured to reflect, toward the first polarization beam splitter, the measurement light reflected by the reflecting surface and transmitted through the first polarization beam splitter and the reference light reflected by the first polarization beam splitter,
   wherein the interferometer is configured so that:
      the measurement light propagates from the first polarization beam splitter to the light-receiving device via the reflecting surface, the first polarization beam splitter, the first mirror surface, the first polarization beam splitter, the reflecting surface, the first polarization beam splitter, and the birefringent-material element, and
      the reference light propagates from the first polarization beam splitter to the light-receiving device via the first mirror surface, the first polarization beam splitter, and the birefringent-material element.

3. The interferometer according to claim 1, wherein the first polarization beam splitter is inclined relative to a plane on which the reflecting surface is to be positioned.

4. The interferometer according to claim 1, wherein the light source comprises a super luminescent diode.

5. A Fizeau interferometer comprising:
a light source;
a first polarization beam splitter film configured to provide a reference surface that reflects, as reference light, a first polarization component of light emitted from the light source, and transmits, as measurement light, a second polarization component of the light emitted from the light source;
a birefringent-material element;
an optical fiber; and
a light-receiving device configured to receive an interfering light generated by interfering the measurement light transmitted through the first polarization beam splitter film, reflected by a reflecting surface to be measured, and transmitted through the first polarization beam splitter film, with the reference light reflected by the first polarization beam splitter film,
wherein the interferometer is configured to propagate the reference light and the measurement light from the first polarization beam splitter film to the light-receiving device through the birefringent-material element and the optical fiber,
wherein the first polarization beam splitter film is formed on an end face of the birefringent-material element, and
wherein a thickness of the birefringent-material element and a position of the reflecting surface are defined to provide the reference light and the measurement light with respective optical path lengths that allow the reference light and the measurement light to interfere with each other, and to provide a stray light of the reference light or the measurement light or both thereof with an optical path length that prevents the stray light from interfering with the reference light and the measurement light.

6. The Fizeau interferometer according to claim 5, wherein the first polarization beam splitter film is inclined relative to a plane on which the reflecting surface is to be positioned.

7. The Fizeau interferometer according to claim 5, wherein the light source comprises a super luminescent diode.

8. A Fizeau interferometer comprising:
a light source;
a first polarization beam splitter film configured to provide a reference surface that reflects, as reference light, a first polarization component of light emitted from the light source, and transmits, as measurement light, a second polarization component of the light emitted from the light source;
a birefringent-material element;
a light-receiving device configured to receive an interfering light generated by interfering the measurement light transmitted through the first polarization beam splitter film, reflected by a reflecting surface to be measured, and transmitted through the first polarization beam splitter film, with the reference light reflected by the first polarization beam splitter film,
wherein the interferometer is configured to propagate the reference light and the measurement light from the first polarization beam splitter film to the light-receiving device through the birefringent-material element,
wherein the first polarization beam splitter film is formed on an end face of the birefringent-material element, and
wherein a thickness of the birefringent-material element and a position of the reflecting surface are defined to provide the reference light and the measurement light with respective optical path lengths that allow the reference light and the measurement light to interfere with each other, and to provide a stray light of the reference light or the measurement light or both thereof with an optical path length that prevents the stray light from interfering with the reference light and the measurement light.

9. The Fizeau interferometer according to claim 8, wherein the first polarization beam splitter film is inclined relative to a plane on which the reflecting surface is to be positioned.

10. The Fizeau interferometer according to claim 8, wherein the light source comprises a super luminescent diode.

* * * * *